United States Patent [19]

Gyr

[11] Patent Number: 5,737,873
[45] Date of Patent: Apr. 14, 1998

[54] POTTED PLANT PROTECTOR

[76] Inventor: Kaj Gyr, 1807 NE. 52nd Ave., Portland, Oreg. 97213

[21] Appl. No.: 637,295

[22] Filed: Apr. 24, 1996

[51] Int. Cl.$^6$ .................................................. A01G 9/02
[52] U.S. Cl. ................... 47/66.6; 47/84; 256/33
[58] Field of Search .................. 47/66 C, 39 P, 47/47 R, 1.01, 66.6, 84; 256/33, 32

[56] References Cited

U.S. PATENT DOCUMENTS

| | | | |
|---|---|---|---|
| 4,760,715 | 8/1988 | Ramos | 63/5.2 |
| 4,995,192 | 2/1991 | DeWid | 47/25 |
| 5,139,234 | 8/1992 | Cochrane | 256/33 |
| 5,528,858 | 6/1996 | Omdahl | 47/84 C |

FOREIGN PATENT DOCUMENTS

| | | | |
|---|---|---|---|
| 1162110 | 9/1958 | France | 47/39 P |
| 122810 | 4/1918 | United Kingdom | 256/33 |

*Primary Examiner*—Henry E. Raduazo

[57] ABSTRACT

A compact potted plant protector comprised of a flexible band forming a plurality of coils (18) wound around a central axis to create a spiral (20). This spiral (20) is wrapped around a plant to create a barrier for cats. The spiral (20) may also be circular, trapezoidal, square, or any form of polygon.

2 Claims, 1 Drawing Sheet

POTTED PLANT PROTECTOR

BACKGROUND

1. Field of Invention

This invention relates to designs for keeping cats out of potted plants, specifically to such designs which are compact and adapted to fit various pot diameters.

2. Description of Prior Art

Cats are attracted to potted plants primarily because of the soil. They like to scratch and dig in it, and sometimes they go to the bathroom. Once this behavior has started, it's very hard to quell. There are a variety of methods for dealing with this: one is to apply chemicals which are disagreeable to cats, and another is simply to make some sort of physical barrier on top of the soil, so that the cats can't get to the soil. People have used rocks, aluminum foil, chicken wire, cardboard, or a wide variety of other solid materials to this end, with varying degrees of success. Any pet store has a choice of chemical means for dissuading cats. There are several plastic potted plant protectors as well, in the form of flat grates that one places over the soil. These grates present problems of their own:

a) They're not adjustable to different pot sizes,
b) They're inherently bulky, and thus hard ship, store, or handle.
c) They're devoid of esthetic value.
d) They don't do a good job of accommodating multi-stemmed plants, as they have a non-flexible frame and fixed openings.
e) They require expensive dies to manufacture.

OBJECTS AND ADVANTAGES

Accordingly, several objects and advantages of my present invention are:

a) to provide a potted plant protector which is adjustable to various pot sizes.
b) to provide a potted plant protector that's compact and easy to ship.
c) to provide a potted plant protector which is esthetically pleasing.
d) to provide a potted plant protector which accommodates multi-stemmed plants.
e) to provide a potted plant protector which is cheap and easy to manufacture.

DRAWING FIGURES

REFERENCE NUMERALS IN DRAWINGS

10 Long side of triangle
12 Medium side of triangle
14 Short side of triangle
16 Attachment clip
18 Coils
20 Spirals

DESCRIPTION—FIGS. 1 TO 3

Figure 1:
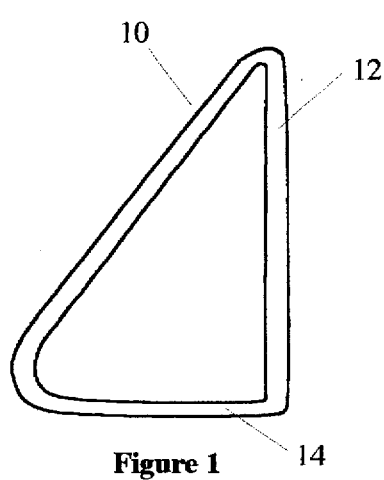
FIG. 1 shows the triangular form that is the keystone of the preferred embodiment.
Figure 2:
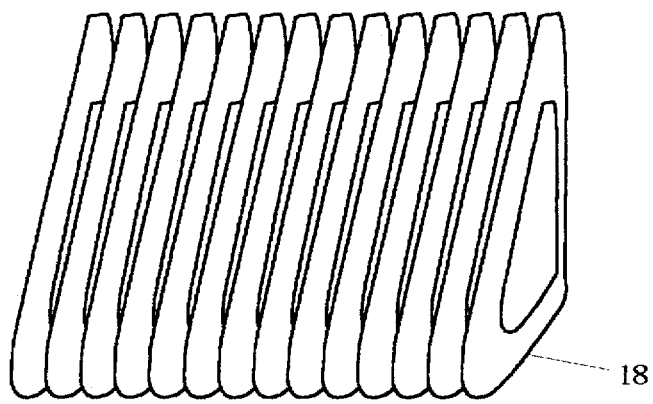
FIG. 2 shows the triangular form incorporated into progressive coils.
Figure 3:
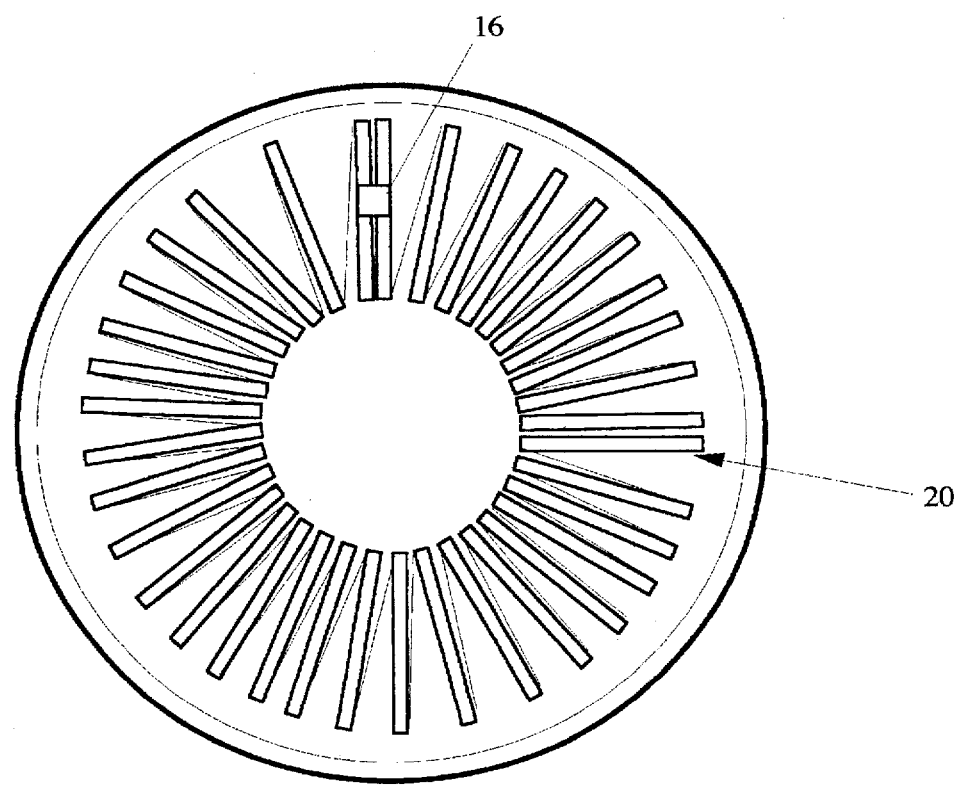
FIG. 3 shows an elevational view of the potted plant protector placed in a pot and wrapped around a plant with the ends secured to each other via an attachment clip.

Typical embodiments of the potted plant protector (also known as the Feline Fooler) are illustrated in FIGS. 2 and 3.

A band of rigid material is wound around a central axis in a triangular shape (comprised of three different length sides: long 10, medium 12, or short 14) to create a spiral 20 of generally 10–20 turns. The spiral may also be circular (cylindrical), trapezoidal, square, or any form of polyhedron. Whatever the shape is, the end result resembles an elongated spring with elastic qualities.

Extruded plastic is generally the material of choice, but the potted plant protector may also be formed from wire, die-cut metals, even plastic-coated cardboard or other fiber products. In order to increase lateral stiffness, whatever material is used should have enough torsional rigidity to inhibit torsional deflection along the length of one coil 18. Each coil's 18 width is generally greater than its thickness on the transverse cross-section. The material needs to be flexible enough from coil 18 to coil 18 to allow for bending of the entire potted plant protector into a complete circle. When the ends are pulled, the coils 18 should assume an axial length far greater than the length of the coils 18 when they are contracted.

In terms of shape, a fight-triangle is most preferable, since it provides the most stability, while offering varied lengths of sides. Typical dimensions for the sides are five, four, and three inches respectively, but these may vary considerably. Standard pots range from seven to fourteen inches in diameter, and the potted plant protector should be dimensionally commensurate with these average pot sizes. One simply places the potted plant protector around the plant on one of its three sides; long 10, medium 12, or short 14, and the potted plant protector fills that amount of space.

An attachment clip 16 which joins the two ends of the potted plant protector together can be made out of any stiff material such that it pinches, fastens, or inserts the two ends together when the potted plant protector is wrapped around a plant.

The potted plant protector may take any form, as long as it takes up space. Any two dimensional shape coupled with an axial spiral accomplishes this. Triangles, trapezoids, other forms of polygons, or even free-forms, are all possibilities.

From the description above, a number of advantages of my potted plant protector become evident:

it provides potted plant protection for various pot sizes.
it provides a potted plant protector that's compact and easy to ship/store/handle.
it provides a potted plant protector which is esthetically pleasing.
it provides a plant protector which accommodates multi-stemmed plants.
it provides a potted plant protector which is cheap and easy to manufacture.

OPERATION—FIGS. 2 AND 3

The manner of using the potted plant protector is quite simple: just wrap it circularly around the plant on top of the soil, and attach the ends to each other via the attachment clip 16. If the potted plant protector is triangular/polyhedral, it can be adjusted to various pot sizes by placing it on one of its variably lengthed sides—whichever is the appropriate length to take up the amount of space between the plant stem and the rim of the pot. The potted plant protector may also accommodate multi-stemmmed plants, as the stems fit in between the coils 18 of the potted plant protector.

Since the potted plant protector contracts into a compact coil 18 when not in use, it may be easily stored and/or shipped. Wrapping can be as simple as attaching a band of material around the length of coils.

Cats are discouraged from getting at the soil, as they are unable to reach it due to the protruding coils 18 of the potted plant protector. Any watering may be done right through the potted plant protector.

SUMMARY, RAMIFICATIONS, AND SCOPE

Accordingly, the reader will see that the various designs outlined in this application can ameliorate the problems which arise when cats get into potted plants. In addition to eliminating the need for chemical deterrents, the potted plant protector replaces any other makeshift forms of keeping cats out of potted plants. The potted plant protector is easy to manufacture, store, ship, and package. Furthermore, the potted plant protector has additional advantages in that:

- it provides a a potted plant protector which is esthetically pleasing.
- it provides a potted plant protector which is adjustable to different pot sizes.
- it provides a plant protector which accommodates multi-stemmed plants.

Although the description above contains many specificities, these should not be construed as limiting the scope of the invention, but as merely providing illustrations of some of its presently preferred embodiments. For example, the number of windings and size may vary, depending on anticipated pot size. The attachment clip 16 can be replaced by some integral form of attachment, or simply tape. The potted plant protector may be made such that it lays on its side, as opposed to standing upright. It may be made of a variety of materials; anything from recycled plastic to plastic-coated cardboard. It can be also be made out of more ductile materials, such that it can be reshaped or flattened. Material may be placed over the potted plant protector such that the coils 18 themselves are covered. Various colors and dimensions are possible. Means for securing the potted plant protector to the rim of the pot and/or the plant itself can also be explored.

In larger form, the potted plant protector can be used as a physical barrier for toddlers, or pests such as squirrels and garden marauders. The spiral form of the potted plant protector may be adapted for use in fold-out letter holders and CD Racks as well. Thus the scope of this invention should be determined by the appended claims and their legal equivalents, rather than by the examples given.

I claim:

1. A protector device adapted for use with a flower/plant container of predetermined size and shape, said container when filled with growing medium defining an upper surface of growing medium of predetermined width attractive to children or small animals, said device comprising: a flexible band of material forming a plurality of coils wound around a center axis to create a spiral, said spiral having a diameter less than half of said width but large enough to prevent access to said growing medium whereby said spiral may be placed around a plant in order to prevent children or small animals from getting at said upper surface of said growing medium.

2. The protector device of claim 1 wherein said spiral is polygonal in shape.

* * * * *